United States Patent [19]

Heibel

[11] Patent Number: 4,732,242
[45] Date of Patent: Mar. 22, 1988

[54] SPOT-TYPE DISC BRAKE FOR VEHICLES

[75] Inventor: Helmut Heibel, Moschheim, Fed. Rep. of Germany

[73] Assignee: Lucas Industries public limited company, Birmingham, England

[21] Appl. No.: 874,166
[22] PCT Filed: Sep. 24, 1985
[86] PCT No.: PCT/EP85/00493
  § 371 Date: May 23, 1986
  § 102(e) Date: May 23, 1986
[87] PCT Pub. No.: WO86/01865
  PCT Pub. Date: Mar. 27, 1986

[30] Foreign Application Priority Data

Sep. 24, 1984 [DE] Fed. Rep. of Germany ... 8428099[U]

[51] Int. Cl.$^4$ .................. F16D 65/14; F16D 65/38
[52] U.S. Cl. .................. 188/73.45; 188/73.39
[58] Field of Search ............. 188/73.31, 73.43, 73.44, 188/73.45, 73.39, 206 R, 369, 370

[56] References Cited

U.S. PATENT DOCUMENTS 4,061,209 12/1977 Gee et al. ............... 188/73.45 X
4,350,229 9/1982 Ito et al.

FOREIGN PATENT DOCUMENTS 2232701 1/1975 France .
2488962 2/1982 France .
0061340 4/1983 Japan ............... 188/73.45
0073633 4/1984 Japan ............... 188/73.45
8403338 8/1984 World Int. Prop. O. ....... 188/73.45
2018920 10/1979 United Kingdom ............ 188/73.45
2033988 5/1980 United Kingdom .
2060093 4/1981 United Kingdom .
2072775 10/1981 United Kingdom .

Primary Examiner—Andres Kashnikow
Assistant Examiner—Richard Potosnak
Attorney, Agent, or Firm—Scrivener and Clarke

[57] ABSTRACT

A brake carrier (12) straddling the edge of a brake disc (10) guides two brake pads (24,26) disposed at one side each of the brake disc (10). The brake comprises an actuator (22) having an actuating axis (B) defining a radial center plane (C) together with the axis (A) of the brake disc. Two guide bolts (18,20) are arranged at the brake carrier (12) at least approximately parallel to the axis (A) of the brake disc at that side of the center plane (C) which is the trailing side, based on the direction of rotation (D) of the brake disc (10) during forward travelling. A caliper (16) is guided for displacement at the brake carrier (12) by means of the guide bolts (18,20). The actuator (22) acts directly on the one brake pad (24) and by way of the caliper (16) on the other brake pad (26). The brake carrier (12) has guide faces (34,36) for the brake pads (24,26) effective upon braking during forward travelling at the trailing side only. The caliper (16) has support faces (40,41) for the brake pads (24,26) effective upon braking during backward travelling. The brake carrier (12) and the caliper (16) are interconnected at the side opposite the brake actuator (22) by an additional sliding couple (46,52) effective upon braking during backward travelling and at least partly relieving the guide bolts (18,20) of moments of the caliper (16) in respect of an axis which is normal to the axis (A) of the brake disc and the actuating axis (B).

6 Claims, 6 Drawing Figures ated the brake carrier or the caliper to transmit peripheral forces and moments, and the sliding couple results from the fact that a portion of the bolt engages in a bore formed in the other structural member.

SPOT-TYPE DISC BRAKE FOR VEHICLES

The invention relates to a spot-type disc brake for vehicles, comprising a brake carrier which straddles the edge of a brake disc, a pair of brake pads arranged at one side each of the brake disc and guided at the brake carrier, an actuator having an actuating axis defining a radial center plane together with the axis of the brake disc, a pair of guide bolts arranged at the brake carrier at least approximately parallel to the axis of the brake disc at that side of the center plane which is the trailing side based on the direction of rotation of the brake disc during forward travelling, a caliper guided for displacement by the guide bolts, the actuator acting directly on the one brake pad and by way of the caliper on the other brake pad, and the brake carrier comprising effective guide faces for the brake pads upon braking during forward travelling at the trailing side only, while the caliper comprises support faces for the brake pads effective upon braking during backward travelling.

In spot-type disc brakes of this kind the peripheral forces which act on the brake pads upon braking during forward travelling are transmitted directly to the brake carrier by the guide faces mentioned.

In a known brake of the same generic kind (EP-A 011 94 66) both brake pads are supported by a projection each on the support faces of the caliper and simultaneously by a shoulder each on a guide face of a brake carrier upon braking during backward travelling. The peripheral forces accommodated by the caliper are transmitted to the brake carrier by way of the guide bolts.

These peripheral forces exert a moment on the caliper likewise to be transmitted by the guide bolts to the brake carrier. This moment tends to tilt the caliper about an axis which is normal to the axis of the brake disc and the actuating axis and it may lead to bending deformation of both guide bolts if the peripheral forces are especially great when braking during backward travelling. The displaceability of the caliper may suffer from such deformation of the guide bolts.

It is the object of the invention to develop a spot-type disc brake such that hard braking is permissible even during backward travelling without impairing the displaceability of the caliper.

This object is met, in accordance with the invention, in a spot-type disc brake of the kind defined initially in that the brake carrier and the caliper are interconnected by an additional sliding connection at the side opposite the brake actuator and effective upon braking during backward travelling to relieve the guide bolts at least in part of moments of the caliper in respect of an axis which is normal to the axis of the brake disc and the actuating axis.

In this manner part of the peripheral forces occurring upon braking during backward travelling and above all their moments regarding the latter axis are transmitted by the caliper to the brake carrier by way of the additional sliding connection. Consequently the guide bolts should not suffer any deformations which might impair the displaceability of the caliper. Even if extremely great peripheral forces should occur upon braking during backward travelling, there is reduced risk that the guide bolts be deformed permanently, let alone be pulled out of their fastening locations.

The additional sliding couple may be formed in especially simple manner by a bolt and a bore. The bolt is firmly connected to one of the two structural members, namely the brake carrier or the caliper to transmit peripheral forces and moments, and the sliding couple results from the fact that a portion of the bolt engages in a bore formed in the other structural member.

It proved to be convenient to arrange the bolt with clearance all around in the corresponding bore but offset eccentrically forward with respect to the bore in the direction of forward rotation of the brake disc. This will assure that contamination and corrosion do not impede the displaceability of the caliper while, on the other hand, the additional sliding connection becomes effective upon braking during backward travelling before the guide bolts become loaded unnecessarily by moments.

Moreover, it is convenient to arrange the additional sliding couple such that a point of the additional sliding couple constitutes an apex of a triangle the legs of which, starting from this apex pass through an end point of an area each of which the two guide bolts are guided respectively, and the third leg of this triangle passes through a starting point each of these two areas, the lines of action of the resulting peripheral forces acting on the two brake pads upon braking intersecting the plane of this triangle within these legs.

The invention will be described further, by way of example, with reference to the accompanying drawings, in which.

Figure 1:
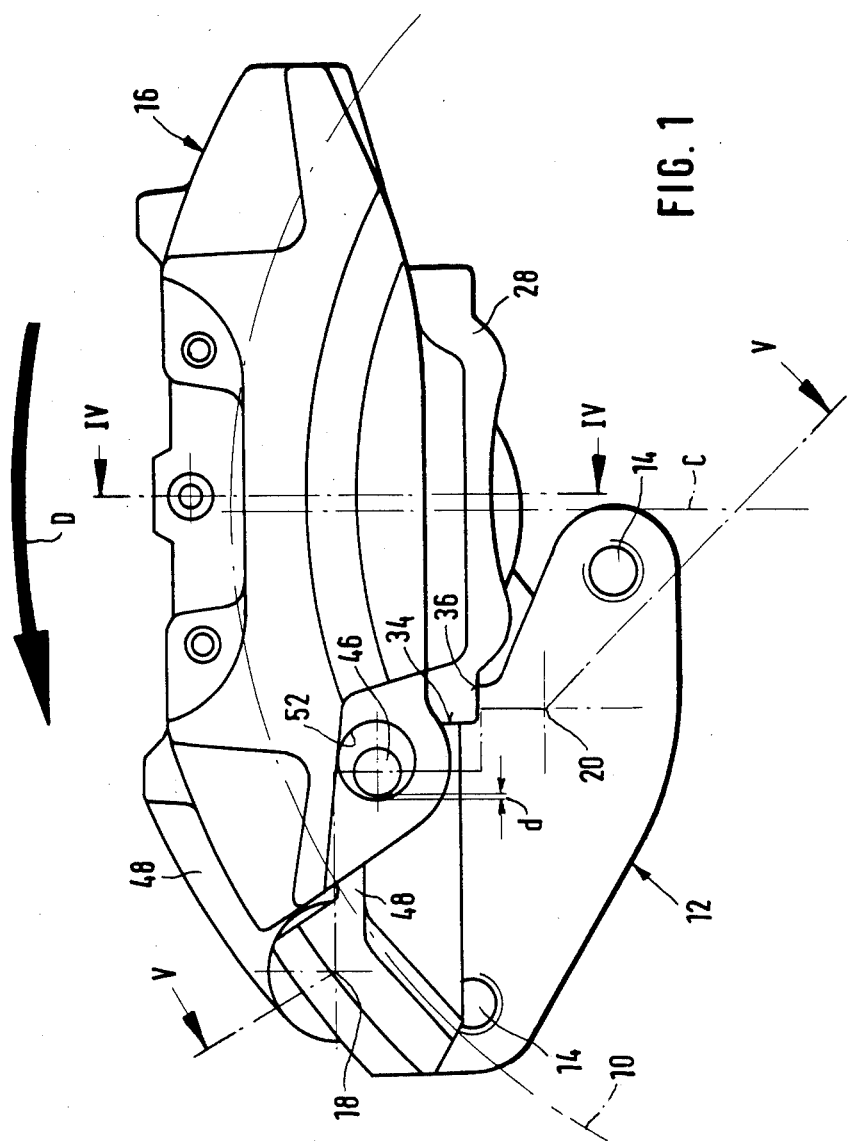
FIG. 1 is a side elevation of a spot-type disc brake as seen from the outer side with respect to the vehicle.

A brake disc 10 is associated with the brake shown and parts of the brake disc, especially of its outer edge as well as the axis A of the brake disc are indicated by dash-dot lines. The brake comprises a brake carrier 12 straddling the edge of the brake disc 10 and having two threaded bores 14 for fixing to a structural member of a vehicle, e.g. an axle journal. A caliper 16 guided for displacement parallel to the axis A of the brake disc at the brake carrier 12, as will be explained below, embraces the outer edge of the brake disc 10.

A radially outer main guide bolt 18 extending parallel to the axis A of the brake disc is fastened at the side of the caliper 16 which is the inner side with respect to the vehicle. A pin formed at the main guide bolt 18 fits in a through bore formed in the caliper 16. A projection formed at main guide bolt 18 abuts against one side of the through bore, while the head of a screw threaded into the pin abuts against the other side. The main guide bolt 18 is guided for displacement substantially without clearance in parallel with the axis A of the brake disc in a first guide bore 19 formed in the brake carrier 12. The guide bore 19 is sealed against the main guide bolt 18 in the usual manner by means of a sealing boot.

A secondary guide bolt 20 is arranged radially further inwardly in parallel with the main guide bolt 18 and connected to the caliper 16 in a manner similar to the main guide bolt 18. The secondary guide bolt 20 is guided in a second guide bore 21 of the brake carrier 12 and likewise sealed by a sealing boot with respect to this guide bore. Any tolerances in spacing between the two guide bolts 18 and 20 caused by the manufacture are balanced by clearance of the pin of the secondary guide bolt 20 in the corresponding through bore of the caliper 16.

At its side which is the inner side with respect to the vehicle the caliper 16 comprises an hydraulic actuator 22 the axis of which extends parallel to the axis A of the brake disc and will be referred to below as the actuating axis B. The common plane of the two axes A and B will be referred to below as the center plane C. The direction of rotation of the brake disc 10 during forward travelling of the corresponding vehicle is indicated by arrow D in FIG. 1. That side of the brake and of each of its component parts which is reached first by any point of the forwardly rotating brake disc 10 is the leading side, whereas the other side which is beyond the center plane C, as seen from the leading side, is the trailing side.

Applying the above definitions, it may be determined that the brake carrier 12 is disposed exclusively at the trailing side of the brake. Accordingly, also guide bolts 18 and 20 both are located at the trailing side of the brake at a considerable spacing from the center plane C. The main guide bolt 18 is only slightly radially outside of a plane which contains the actuating axis B and extends at right angles with respect to the center plane C. The secondary guide bolt 20 is arranged close to the middle between the main guide bolt 18 and the axis A of the brake disc.

The actuator 22 comprises a piston 23 adapted to act directly on a brake pad 24 which is the inner brake pad with respect to the vehicle and can be pressed against one side of the brake disc 10. At the other side of the brake disc 10 the caliper 16 includes a leg 25 which is parallel to the brake disc and by means of which a brake pad 26, which is the outer brake pad with respect to the vehicle, can be actuated indirectly, i.e. by axial displacement of the caliper 16.

As usual, both brake pads 24 and 26 each include a backplate 28 and a friction lining 30. At the trailing side and at either side of the brake disc 10 the brake carrier 12 has a guide face 34 in parallel with the center plane C and facing the same as well as a guide face 36 perpendicular with respect to the same for the backplace 28 of each of the two brake pads 24, 26.

At the leading side of the caliper 16 a support face 40 for the backplace 28 of the inner brake pad 24 is formed in parallel with the center plane C and so as to face the same. This support face is arranged partly radially outside of the brake disc 10 but it also extends radially inside of the outer edge thereof. A support face 41 of the caliper 16 is associated in corresponding manner with the backplace 28 of the outer brake pad 26. This surface, however, is disposed exclusively radially outside of the outer edge of the brake disc 10.

Retaining pins 42, 44 extend in parallel with the acutating axis B through holes in the backplates 28 of the brake pads 24, 26, the ends of these pins being fastened to the caliper 16. A hold-down spring 45 which rests on the two retaining pins 42, 44 is supported at the backplate 28 of each of the two brake pads 24, 26.

Upon braking during forward travelling peripheral forces $F_{24}$, $F_{26}$ (FIG. 5) acting on the brake pads 24 and 26 are accommodated alone by the guide faces 34 at the brake carrier 12.

Upon braking during backward travelling, on the other hand, the two brake pads 24 and 26 become supported by the corresponding support face 40 or 41 of the caliper 16. The line of action of the peripheral force acting on the inner brake pad 24 passes through the support face 40 so that no moment can be produced which would act on the brake pad 40. The support face 41, on the other hand, lines radially outside of the line of action of the peripheral force acting on the brake pad 26 so that a moment is produced which acts on this brake pad 26. This moment is sustained at the guide face 36 of the brake carrier 12 extending normal to the center plane C.

Figure 6:
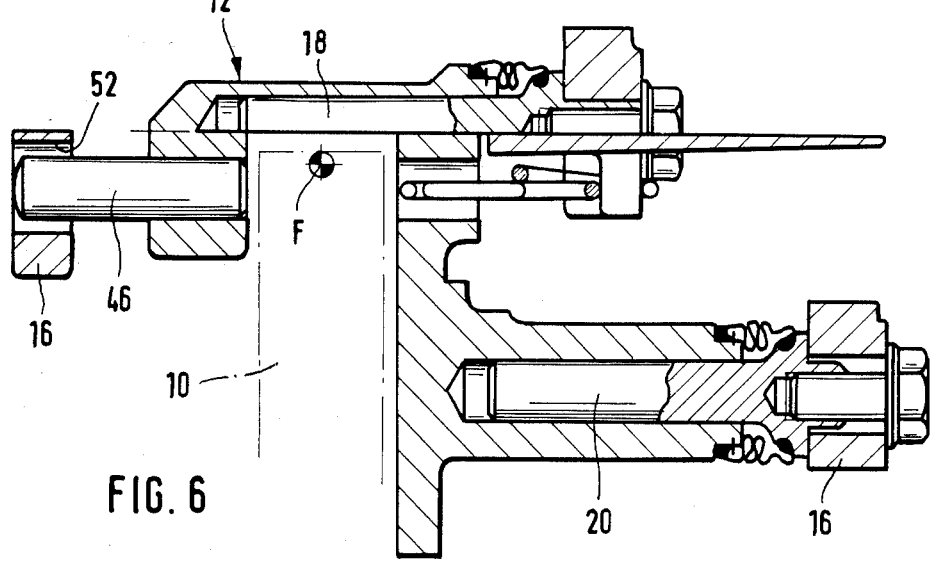
FIG. 6 is the sectional elevation VI—VI in FIG. 3.

The resulting peripheral force F (FIG. 6) accommodated by the caliper 16 upon hard braking during backward travelling is transmitted in part by a bolt 46 to an arm 48 at the side of the brake carrier 12 which is remote from the actuator 22. By one end the bolt 46 is pressed into a reinforced projection 50 of the arm 48 and it extends eccentrically through a bore 52 formed in the caliper 16, normally being radially spaced from the bore all around. The bolt 46 has a small spacing d from a wall portion of the bore 52 at the trailing side, which portion it must support upon braking during backward travelling. The resulting peripheral force F introduced into the caliper 16 by the brake pads 24, 26 upon braking during backward traveling first is transmitted by the guide bolts 18, 20 alone to the brake carrier 12 until minor but still harmless elastic deformations will cause the bolt 46 to overcome the spacing d and support the caliper 16 by the wall of the bore 52 against moments which tend to tilt the same about an axis normal to the axis A of the brake disc and to the actuating axis B. Thus the guide bolts 18 and 20 substantially remain undeformed. The displaceability of the caliper 16 on the guide bolts 18, 20, therefore, is safeguarded even if extraordinarily greater peripheral forces are generated upon braking during backward travelling.

Figure 2:
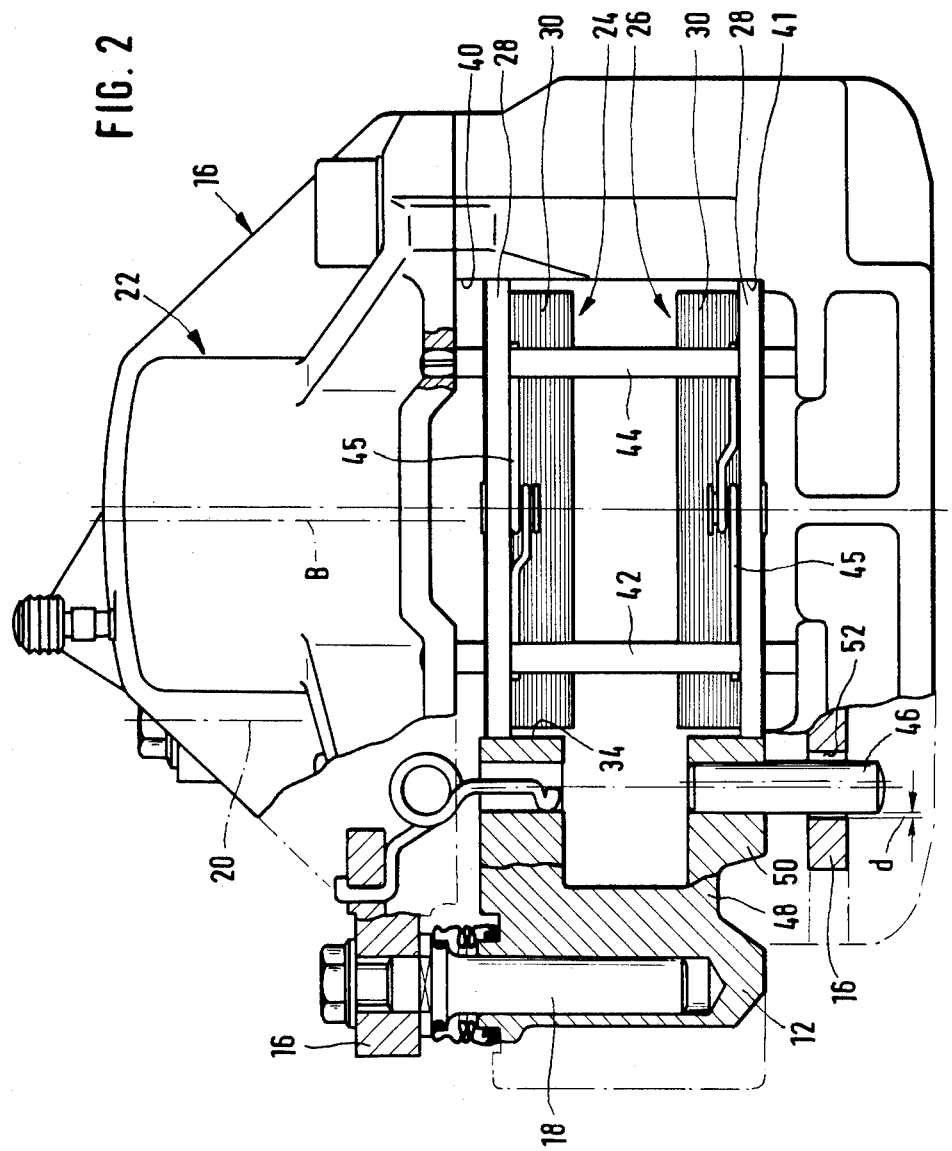
FIG. 2 is the corresponding top plan view.
Figure 3:
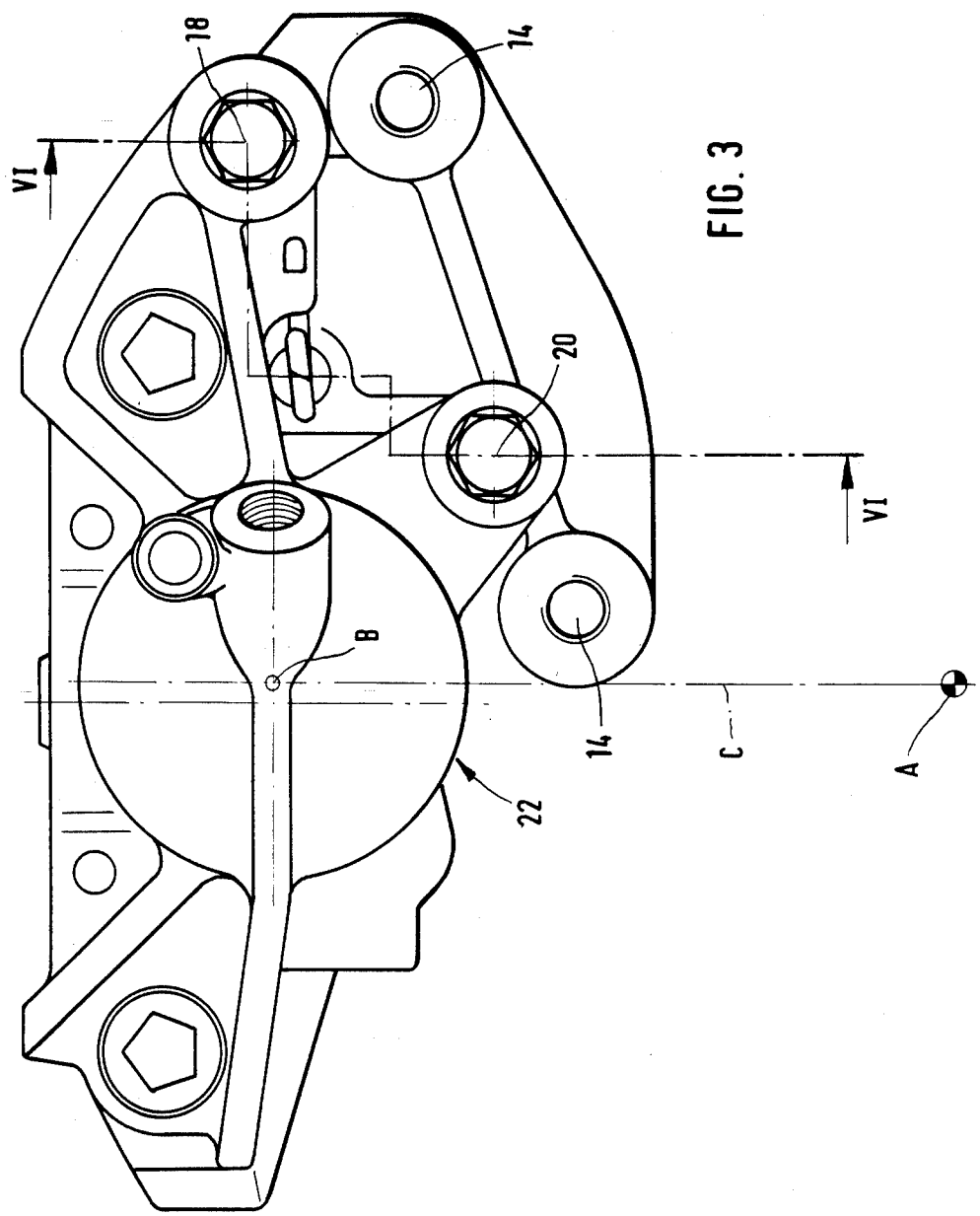
FIG. 3 is a side elevation of the brake as seen from the inner side with respect to the vehicle.
Figure 4:
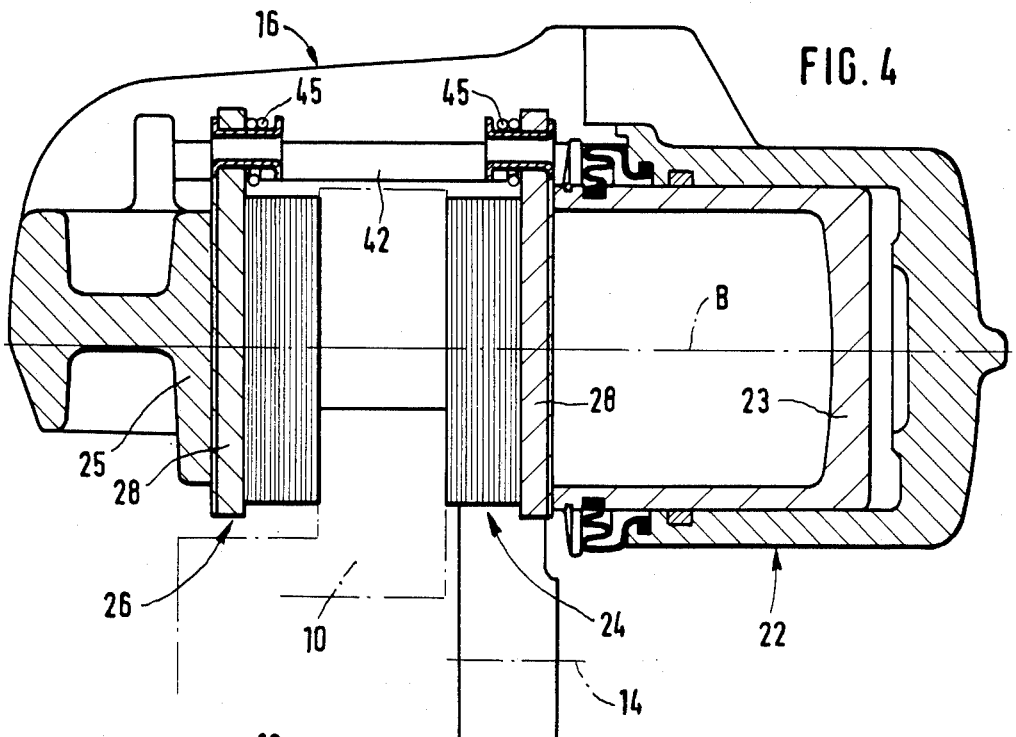
FIGS. 4 and 5 are sectional elevations IV—IV and V—V in FIG. 1.
Figure 5:
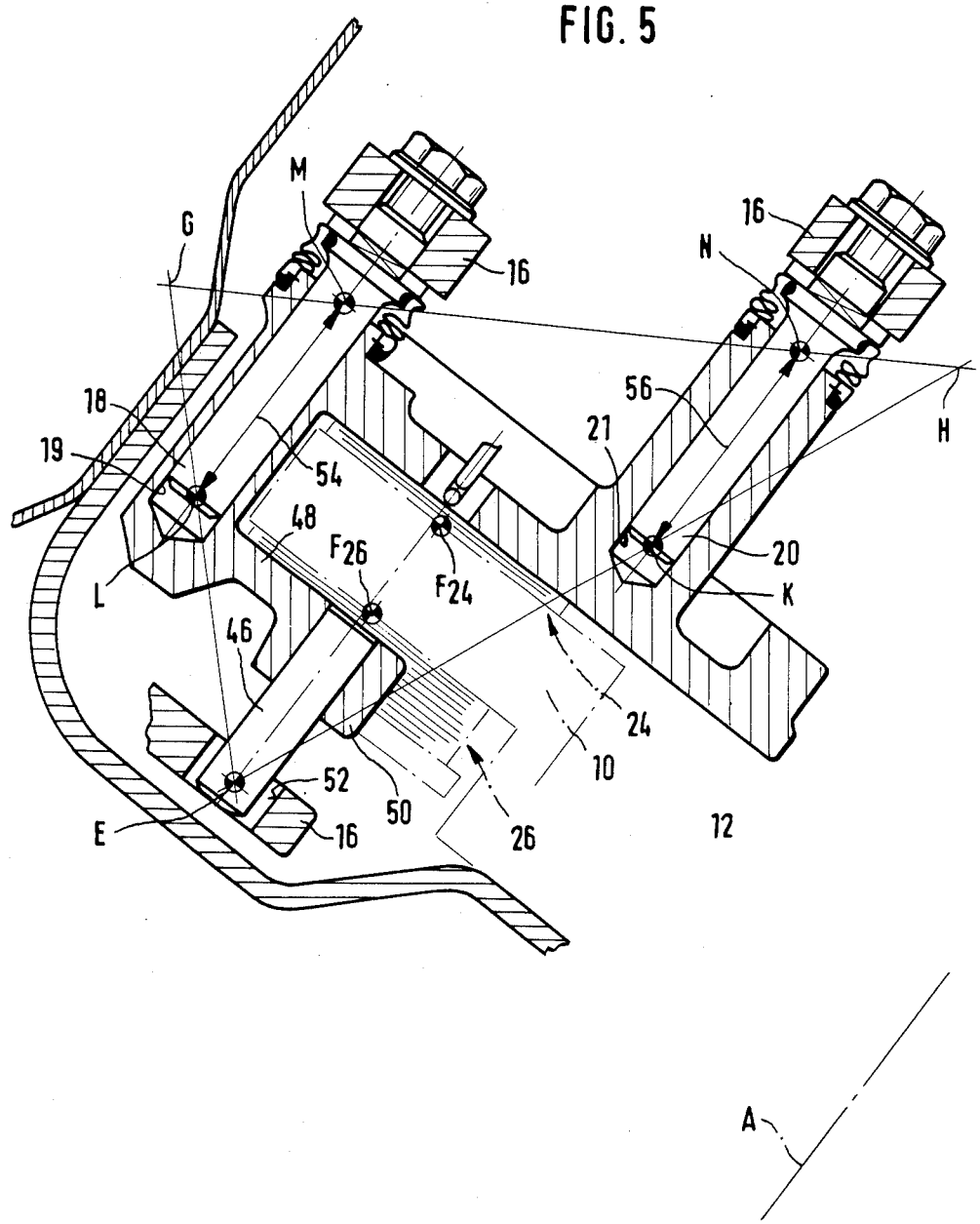

As shown above all in FIG. 2, the arm 48 is placed close to the bore 52 in order to keep low the moment to be accommodated by the projection 50 of the arm 48. Above all, however, the bolt 46 according to FIG. 5 is so arranged that a point E at which it is in sliding engagement with the wall of the bore 52 constitutes an apex of a triangle EGH. One leg EG of this triangle passes through a point L which marks an end of the area 54 in which the main guide bolt 18 is guided in the guide bore 19. Another leg EH extends through the end point K of the area 56 in which the guide bolt 20 is guided in the guide bore 21. In FIG. 5 the area 54 and 56 mentioned are marked by arrows. The starting points M and N of these areas 54, 56 lie on the third leg GH of the triangle mentioned.

The lines of action of the peripheral forces $-F_{24}$ and $-F_{26}$ generated upon braking during backward travelling and consequently also of their resultant F penetrate and the plane of the triangle EGH within the legs EG, EH, GH thereof. For this reason these peripheral forces have small lever arms with respect to the supports of the caliper 16 and they do not tend to tilt and the caliper 16.

The arrangement of the bolt 46 which is offset forwardly in the direction of forward rotation D and eccentric with respect to the axis of the bore 52 is so selected that the spacing d between the bolt 46 and the closest wall area of the bore 52 is approximately from 0.3 to 0.7 mm. Thus the bolt 46 should not get stuck in the bore 50 even in case of contamination or corrosion. The displaceability of the caliper 16 upon braking during forward travelling consequently is not affected by the bolt 46. The arrangement described of the bolt 46 fixed to the arm 48 requires no great additional expenditure as to material in order to transmit forces and moments and, therefore, does not involve any increase in weight worth mentioning of the brake. The brake carrier 12 with its arm 48 for accommodating the forces and moments occurring is so dimensioned that it can be made of a material which can be processed easily and economically, such as gray cast iron.

What is claimed is:

1. A spot-type disc brake for vehicles, comprising
a brake carrier (12) which straddles the ege of a brake disc (10),
a pair of brake pads (24,26) arranged at one side each of the brake disc (10) and guided at the brake carrier (12),
an actuator (22) having an actuating axis (B) defining a radial center plane (C) together with the axis (A) of the brake disc,
a pair of guide bolts (18,20) arranged at the brake carrier (12) at least approximately parallel to the axis (A) of the brake disc at that side of the center plane (C) which is the trailing side based on the direction of rotation (D) of the brake disc (10) during forward travelling,
a caliper (16) guided for displacement by the guide bolts (18,20),
the actuator (22) acting directly on the one brake pad (24) and by way of the caliper (16) on the other brake pad (26) and the brake carrier (12) comprising effective guide faces (34,36) for the brake pads (24,26) upon braking during forward travelling at the trailing side only, while the caliper (16) comprises support faces (40,41) for the brake pads (24,26) effective upon braking during backward travelling, characterized in that the brake carrier (12) and the caliper (16) are interconnected by an additional sliding connection (46,52) at the side opposite the brake actuator (22), said connection comprising two members which are out of effective load sharing engagement with each other upon braking during forward travelling but which are moved into effective load sharing engagement with each other upon braking during backward travelling to relieve the guide bolts (18,20) at least in part of moments of the caliper (16) in respect of an axis which is normal to the axis (A) of the brake disc and the actuating axis (B).

2. The spot-type disc brake as claimed in claim 1, characterized in that the additional sliding connection is formed by a bolt (46) on one of said brake carrier (12) and said caliper (16) and a bore (52) on the other of said brake carrier (12) and said caliper (16).

3. The spot-type disc brake as claimed in claim 2, characterized in that the bolt (46) is fastened at an arm (48) of the brake carrier (12) at the side of the brake disc (10) remote from the actuator (22).

4. The spot-type disc brake as claimed in claim 2 or 3, characterized in that the central axis of the bolt (46) is disposed offset forwardly with respect to the central axis of the bore (5), based on the direction of forward rotation (D) of the brake disc (10).

5. The spot-type disc brake as claimed in one of claims 1, 2 or 3, characterized in that a point (E) of the additional sliding couple (46,52) constitutes an apex of a triangle (EGH) the legs (EG,EH) of which, starting from this apex, pass through an end point (K and L, respectively) of an area (54,56) each in which the two guide bolts (18,20) are guided respectively, and the third leg (GH) of this triangle (EGH) passes through a starting point (M and N, respectively) each of these two areas (54,56), and in that the modes of action of the resulting peripheral forces ($F_{24}$, $F_{26}$) acting on the two brake pads (24,26) upon braking penetrate the plane of the triangle (EGH) within the legs (Eg,EH,GH) thereof.

6. The spot-type disc brake of claim 1, wherein during braking in forward travelling there is a clearance (d) between said two members (46,52) which clearance is selected in conformity with elastic deformation of said guide bolts (18,20) during braking in backward travelling whereby the clearance is taken up and load is shared between said members (46,52) while said guide bolts (18,20) remain substantially undeformed.

* * * * *